(12) United States Patent
Carmody

(10) Patent No.: US 11,666,857 B2
(45) Date of Patent: Jun. 6, 2023

(54) GLYCOL DEHYDRATION UNITS AND METHODS

(71) Applicant: Paul A. Carmody, Spring, TX (US)

(72) Inventor: Paul A. Carmody, Spring, TX (US)

( * ) Notice: Subject to any disclaimer, the term of this patent is extended or adjusted under 35 U.S.C. 154(b) by 170 days.

(21) Appl. No.: 16/894,595

(22) Filed: Jun. 5, 2020

(65) Prior Publication Data

US 2020/0384409 A1 Dec. 10, 2020

Related U.S. Application Data

(60) Provisional application No. 62/956,617, filed on Jan. 2, 2020, provisional application No. 62/949,594, filed on Dec. 18, 2019, provisional application No. 62/859,134, filed on Jun. 9, 2019.

(51) Int. Cl.
| | |
|---|---|
| *B01D 53/26* | (2006.01) |
| *B01D 53/14* | (2006.01) |
| *B01D 53/18* | (2006.01) |
| *C10L 3/10* | (2006.01) |

(52) U.S. Cl.
CPC ....... *B01D 53/263* (2013.01); *B01D 53/1406* (2013.01); *B01D 53/1425* (2013.01); *B01D 53/185* (2013.01); *C10L 3/106* (2013.01); *B01D 2252/2023* (2013.01); *B01D 2256/24* (2013.01); *B01D 2257/80* (2013.01)

(58) Field of Classification Search
CPC ............. B01D 53/263; B01D 53/1406; B01D 53/1425; B01D 53/185; B01D 2252/2023; B01D 2256/24; B01D 2257/80; C10L 3/106; C10L 2290/12
See application file for complete search history.

(56) References Cited

U.S. PATENT DOCUMENTS

| | | |
|---|---|---|
| 3,105,748 A | 10/1963 | Stahl |
| 6,375,806 B1 | 4/2002 | Hicks |
| 9,511,323 B2 | 12/2016 | Lugosch |
| 2004/0031389 A1* | 2/2004 | Heath .................. B01D 53/263 |
| | | 95/193 |

(Continued)

OTHER PUBLICATIONS

Engineering Data Book FPS Version, Tulsa; Gas Processors Suppliers Association, Tulsa; 2016, fourteenth edition pp. 20-42 to 20-43.

(Continued)

*Primary Examiner* — Stephen Hobson

(57) ABSTRACT

A still/stahl column includes a still section, a primary stahl section, the primary stahl section positioned beneath the still section, and a polishing stahl section, the polishing stahl section positioned beneath the primary stahl section. A process also includes feeding a water rich glycol still feed stream to the still section and feeding a stripping gas feed stream to the polishing still section. The process includes withdrawing a reboiler draw stream from the still section and heating the reboiler draw stream in a reboiler to form a reboiler inlet stream. The process includes injecting the reboiler inlet stream into the primary stahl section, stripping water from the water rich glycol with the stripping gas, and withdrawing a still stripping gas stream from a top portion of the still section. A lean glycol polishing discharge stream is withdrawn from a bottom portion of the polishing stahl section.

3 Claims, 6 Drawing Sheets

(56) References Cited

U.S. PATENT DOCUMENTS

| | | | | |
|---|---|---|---|---|
| 2006/0043000 A1* | 3/2006 | Gaskin | .................. | F25J 3/0252 |
| | | | | 208/177 |
| 2007/0084341 A1* | 4/2007 | Heath | ...................... | C10L 3/10 |
| | | | | 95/117 |
| 2010/0000255 A1* | 1/2010 | Mak | ...................... | B01D 53/14 |
| | | | | 62/625 |
| 2013/0056677 A1* | 3/2013 | Bela | .................. | B01D 53/1468 |
| | | | | 252/190 |
| 2014/0331862 A1* | 11/2014 | Cullinane | ............ | B01F 25/313 |
| | | | | 95/219 |
| 2015/0005564 A1* | 1/2015 | Tanna | ............... | B01D 53/1406 |
| | | | | 96/242 |
| 2017/0232379 A1* | 8/2017 | Carmody | ............ | B01D 53/263 |
| | | | | 95/191 |

OTHER PUBLICATIONS

Worley, Steve; "Super-Dehydration with Glycols"; Gas Conditioning Conference; Norman, OK; 1967; pp. H5-H6.

\* cited by examiner

GLYCOL DEHYDRATION UNITS AND METHODS

CROSS-REFERENCE TO RELATED APPLICATIONS

This application is a U.S. non-provisional application that claims priority from U.S. provisional application No. 62/956,617, filed Jan. 2, 2020; 62/949,594, filed Dec. 18, 2019; and 62/859,134, filed Jun. 9, 2019, which are incorporated by reference herein in their entirety.

FIELD

Embodiments of the present disclosure generally relate to methods and units for removing undesirable components or drying a gas stream using glycol.

BACKGROUND

One method of drying gas streams, including, for example, natural gas, fuel gas, methane, ethane, or other hydrocarbon gases and mixtures of hydrocarbon gases (referred to herein as "wet gas") is the use of a drying unit described in U.S. Pat. No. 3,105,748 (the '748 patent), which is incorporated herein by reference in its entirety. In an absorber, wet gas is dried through intimate contact with glycol to form dry gas. Without being bound by theory, generally less moisture in the glycol allows for more efficient absorption of water and other contaminants from the wet gas. The focus of the '748 patent is the super dryer, referred to herein as a "stahl column" where a portion of the dry gas from the output of the absorber is used to remove moisture from glycol.

SUMMARY

The present disclosure provides for a process. The process includes supplying a still/stahl column. The still/stahl column includes a still section, a primary stahl section, the primary stahl section positioned beneath the still section, and a polishing stahl section, the polishing stahl section positioned beneath the primary stahl section. The process also includes feeding a water rich glycol still feed stream to the still section, the water rich glycol feed stream having water rich glycol. In addition, the process includes feeding a stripping gas feed stream to the polishing still section, the stripping gas feed stream having stripping gas. Also, the process includes withdrawing a reboiler draw stream from the still section and heating the reboiler draw stream in a reboiler to form a reboiler inlet stream. Further, the process includes injecting the reboiler inlet stream into the primary stahl section, stripping water from the water rich glycol with the stripping gas, and withdrawing a still stripping gas stream from a top portion of the still section. In addition, the process includes withdrawing a lean glycol polishing discharge stream from a bottom portion of the polishing stahl section.

The present disclosure also provides for a still/stahl column. The still/stahl column includes a still section and a primary stahl section, the primary stahl section positioned beneath the still section. In addition, the still/stahl column includes a polishing stahl section, the polishing stahl section positioned beneath the primary stahl section and a reboiler, the reboiler fluidly connected to the still section and the primary stahl section.

The present disclosure includes a liquid lifting vessel. The liquid lifting vessel has a gas/glycol mixing pot, a glycol outlet downcomer, the glycol outlet downcomer positioned on top of the gas/glycol mixing pot, and a gas/glycol separator, the gas/glycol separator positioned on top of the glycol outlet downcomer.

The present disclosure also includes a liquid lifting vessel. The liquid lifting vessel includes a gas/glycol mixing pot and a gas/glycol separator, the gas/glycol separator positioned on top of the glycol outlet downcomer. In addition, the liquid lifting vessel includes a gas/glycol riser, the gas/glycol riser positioned annularly within the gas/glycol separator and extending into the gas/glycol mixing pot. Further, the liquid lifting vessel includes a velocity control rod, the velocity control rod disposed annularly within the gas/glycol riser.

BRIEF DESCRIPTION OF DRAWINGS

The present disclosure may be understood from the following detailed description when read with the accompanying figures.

DETAILED DESCRIPTION

Figure 1:
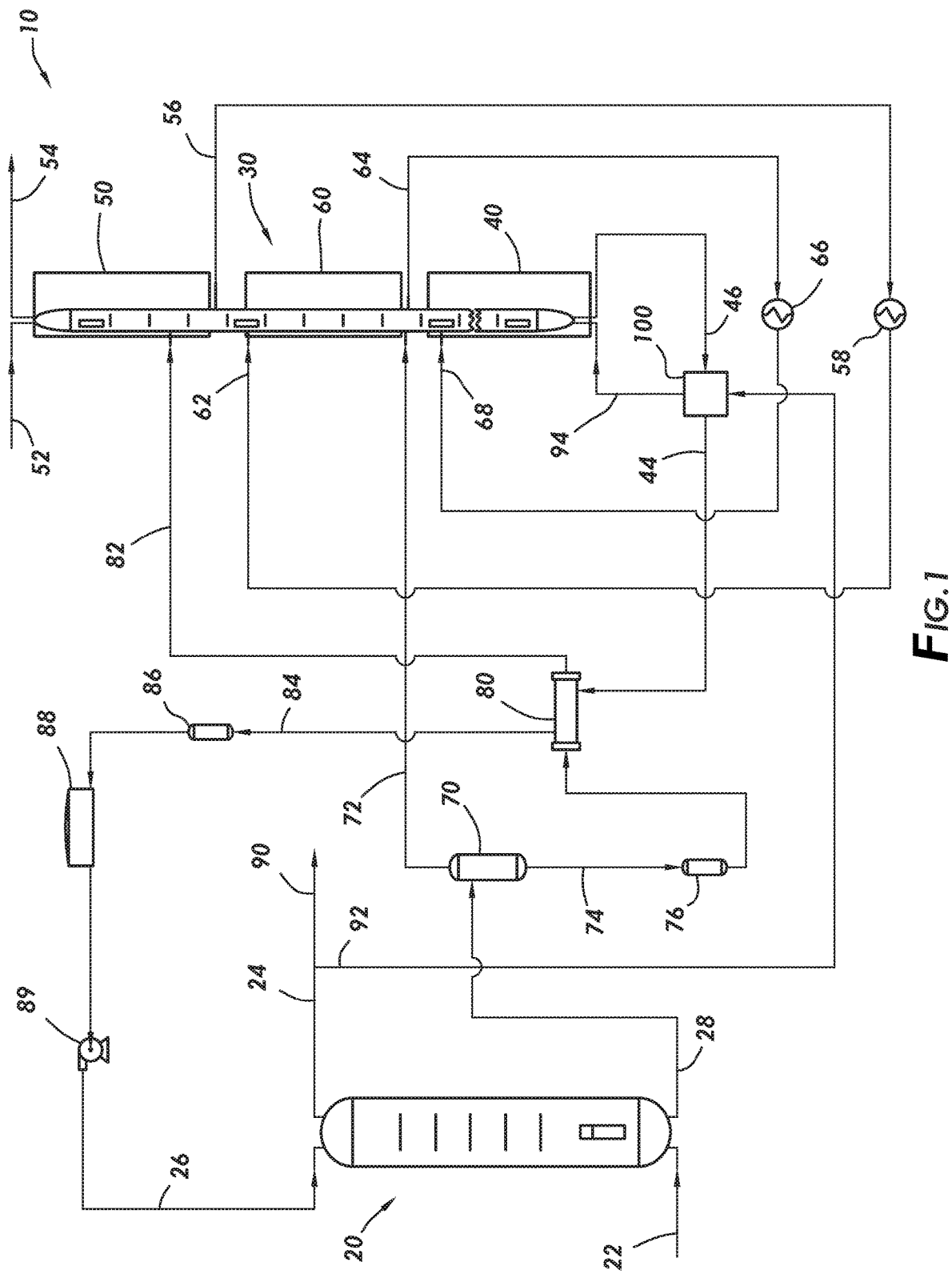
FIG. 1 depicts a process flow diagram in accordance with certain embodiments of the present disclosure.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Wet Gas: Wet gas that is to be dehydrated is present in stream 22. Wet gas may be gas saturated with water. Wet gas may have a water content from 15 to 175 pounds of water/MMSCF of gas (316 ppmv to 3686 ppmv). Wet gas, as the term is used in the present disclosure, may be gas that has been dehydrated suitable for transporting gas in a pipeline but would require additional dehydration, such as to less than 4 pounds of water/MMSCF (84 ppmv) or 7 pounds of water/MMSCF (147 ppmv).

Dry gas: Dry gas is gas that meets a dehydration specification. In cryogenic dehydration applications, the dehydration spec may be 0.1 ppmv. In other non-cryogenic applications, the dehydration spec may be 3.2 ppmv.

Lean Glycol: Lean glycol is the glycol with a water concentration equal to or lower than the water concentration present in stream 46. Lean glycol has a water content range from 1 ppmw to 100 ppmw of water.

Rich glycol: Rich glycol is glycol that has exited contactor 20 but has not exited polishing stahl column 40 as lean glycol polishing discharge stream 46. Rich glycol water concentration may vary as water is being removed from the rich glycol.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate to a system and process for drying wet gas. With reference to FIG. 1, wet gas drying system 10 includes absorber 20 and still/stahl column 30. In certain embodiments, such as that shown in FIG. 1, still/stahl column 30 includes still section 50, primary stahl column section 60, and polishing stahl column section 40. In certain embodiments, as shown in FIG. 1, still/stahl column 30 is a single column, having still section 50 at the top, primary stahl column section 60 beneath still section 50, and polishing stahl column section 40 beneath primary stahl column section 60. In other embodiments, still section 50, primary stahl column section 60, and polishing stahl column section 40 are separate columns.

Wet process gas stream 22, which includes wet gas, is fed to absorber 20 where the wet gas is dried with glycol as the wet gas passes through absorber 20. After drying, the hydrocarbon gas exits absorber 20 as dry gas stream 24. Dry gas stream 24 may be split into dry production stream 90 and stripping gas stream 92.

Lean glycol is introduced into absorber 20 through lean glycol stream 26. After absorbing water and other contaminants from the wet gas, water rich glycol exits absorber 20 through rich glycol stream 28. The water rich glycol in rich glycol stream 28 further includes hydrocarbon gas, hydrocarbon liquids, and may include without limitation, carbon dioxide and hydrogen sulfide.

Rich glycol stream 28 is fed to flash gas separator 70, where a portion of the volatiles, such as a portion of the hydrocarbon gas, are separated from the rich glycol to form flash gas stream 72 and flashed glycol stream 74. In certain embodiments, flash gas separator 70 may be a three phase separator with separation and removal of a liquid hydrocarbon stream in addition to separation to form flash gas stream 72 and flashed glycol stream 74. Flash gas separator 70 may be heated or unheated. An unheated flash gas separator may have flash gas that is too wet for injection into the bottom of polishing stahl column section 40. At an approximate water content of 160 lb/MMSCF (3370 ppmv), the flash gas may be dry enough to be injected at a point within still/stahl column 30 where the stripping vapor in the column is wetter than flash gas stream 72. In certain non-limiting embodiments, primary stahl column section 60 may contain about 20' of packing, and polishing stahl column section 40 may also contain about 20' of packing.

It may be desirable to introduce flash gas at the same stage in still/stahl column 30 as reheater outlet stream 68 from reheater 66 (described below). Such a stage in still/stahl column 30 may include a chimney tray and be located between the bottom of primary stahl column section 60 and the top of polishing stahl column section 40. In certain embodiments, flash gas stream 72 enters still/stahl column 30 at a separate feed point above the return point of reheater outlet stream 68. In certain embodiments, flash gas stream 72 may not be preheated as reheater 66 adds heat to the liquid entering just below flash gas stream 72 feed point within the chimney tray. The flash gas mixes with the stripping gas that has exited from the top of polishing stahl column section 40 and the combined flow of gas ascends through primary stahl column section 60 and still section 50, removing water as the gas rises.

In certain embodiments, such as the one shown in FIG. 1, flashed glycol stream 74 may be filtered in filter 76. In other embodiments, filter 76 is omitted. Filter 76 may be, for example and without limitation, a solids filter or a sock filter. Flashed glycol stream 74 may then be heated by lean glycol discharge stream 44 in lean/rich heat exchanger 80 to form water rich glycol still feed 82 and cooled lean glycol stream 84. While lean/rich heat exchanger 80 may be omitted, the inclusion of lean/rich heat exchanger 80 allows heating of the rich glycol to be fed to still section 50 and cooling of the lean glycol to be fed to absorber 20. Cooled lean glycol stream 84 may be filtered to remove impurities using filter 86. In certain embodiments, filter 86 may be a charcoal filter. As further shown in FIG. 1, in certain embodiments, cooled lean glycol stream 84 may enter surge tank 88. A portion of the lean glycol may be withdrawn from surge tank 88, such as by circulating pump 89, through lean glycol stream 26. In certain embodiments, no cooling of lean glycol is performed other than that performed in lean/rich heat exchanger 80.

With further direction to FIG. 1, water rich glycol still feed 82 is fed to still section 50, where rich glycol is contacted by hydrocarbon gas from flash gas stream 72 and stripping gas stream 92. Without being bound by theory, it is believed that flash gas from flash gas stream 72 increases the amount of dry gas available to strip water from the rich glycol. Water rich glycol still feed 82 is shown as a side feed, but other feed positions are contemplated by this disclosure. As the rich glycol from water rich glycol still feed 82 is processed through still/stahl column 30, water is stripped from the rich glycol to form lean glycol polishing discharge stream 46. Lean glycol polishing discharge stream 46 may exit polishing stahl column section 40 at or near the bottom of polishing stahl column section 40. The stripping hydrocarbon gas, having absorbed water from the rich glycol, may be discharged from still section 50. In some embodiments, such as that shown in FIG. 1, condensing water stream 52 is introduced into the top of still section 50, condensing glycol, after which still stripping gas stream 54 is discharged from still section 50 along with vaporous water, and other hydrocarbons. In certain embodiments, stripping gas stream 54 may thereafter be burned. In certain embodiments condensing water stream 52 may be omitted and condensing may be accomplished via the use of cooling from a rich glycol stream or by other means.

Reboiler draw stream 56 may be drawn at or near the bottom of still section 50 as a liquid draw, heated in reboiler 58 and returned to still/stahl column 30 as reboiler inlet stream 62 at or near the top of primary stahl column section 60. Reboiler 58 may add heat between still section 50 and primary stahl column section 60. In certain embodiments, reboiler 58 is indirectly heated rather than directly heated. Direct heating may result in high skin temperatures that may decompose the glycol. The temperature of the glycol is reduced as rich glycol falls through primary stahl column section 60 due to the removal of water from the liquid glycol into the vaporous stripping gas. Flash gas stream 72 may be introduced at or near the bottom of primary stahl column section 60. Further, reheater stream 64 may be drawn at or near the bottom of primary stahl column section 60, heated in reheater 66, and returned to polishing stahl column section 40 at or near the top of polishing stahl section 40 as reheater outlet stream 68. Reheater 66 adds heat between primary stahl column section 60 and polishing stahl column section 40.

Small amounts of water may remain in the glycol as the glycol enters the top of polishing stahl column section 40. As a result, without being bound by theory, there is little temperature change across polishing stahl column section 40. While the amount of water removed from the glycol is small as the glycol descends, this portion of still/stahl column 30 is where the water content may be reduced to the concentration where the glycol can be used for cryogenic dehydration applications. Glycol suitable for cryogenic operations typically has less than 10 ppm by weight of water. In certain embodiments, such as that shown in FIG. 1, lean glycol polishing discharge stream 46 may be further processed in liquid lifting vessel 100. In liquid lifting vessel 100, stripping gas stream 92 is intermixed with lean glycol polishing discharge stream 46 to further dry the lean glycol in lean glycol polishing discharge stream 46 and form lean glycol discharge stream 44 and stripping gas stream 94 that may have absorbed a portion of the water from glycol stream 46 and that may have become nearly saturated with glycol absorbed from stream 46. In other embodiments, vapor/liquid contracting vessel 100 is omitted.

Figure 2:
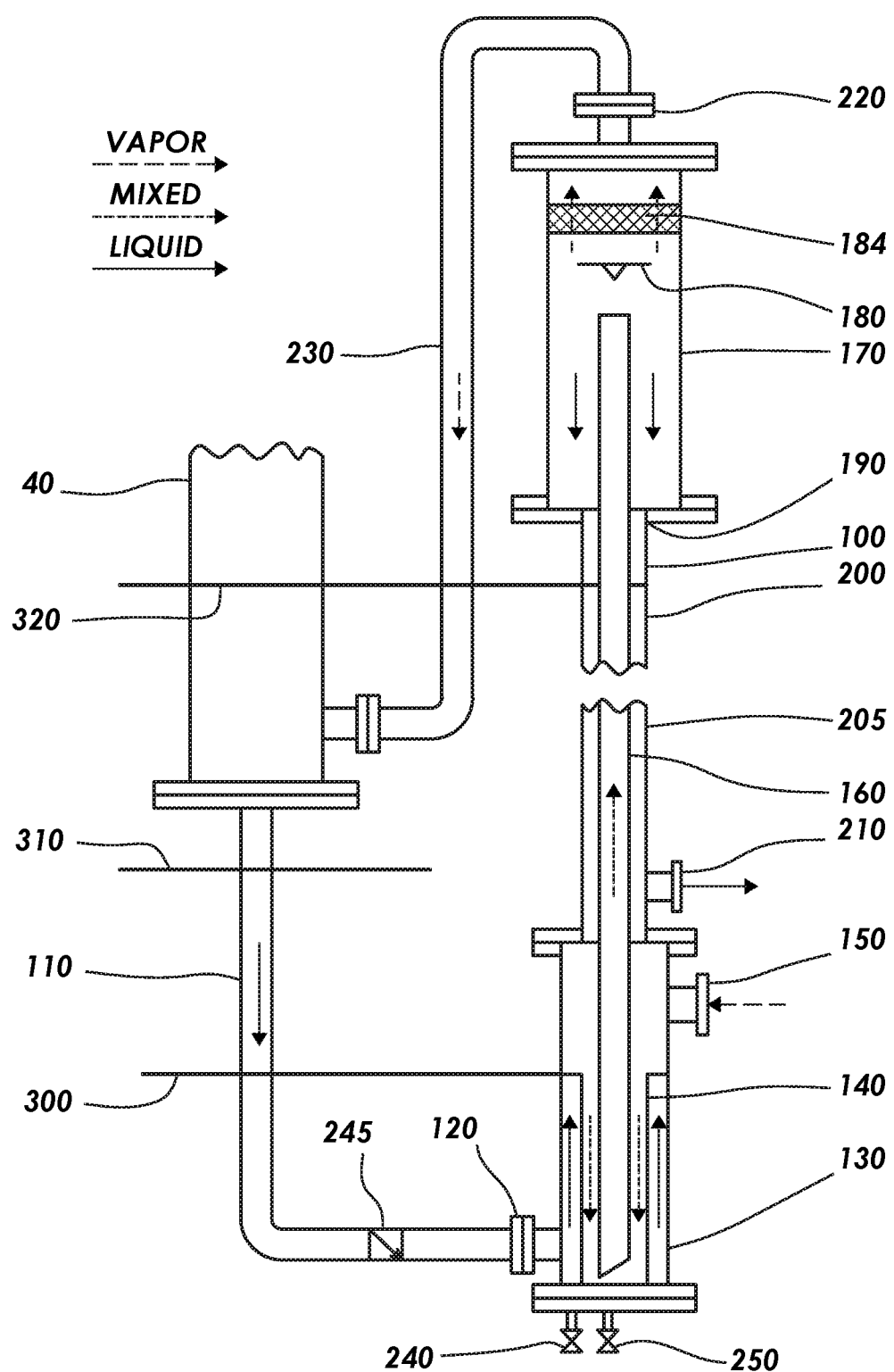
FIG. 2 depicts a liquid lifting vessel consistent with at least one embodiment of the present disclosure.

An example of liquid lifting vessel 100 is shown in FIG. 2. Liquid lifting vessel 100 may mix stripping gas from stripping gas stream 92 with lean glycol from lean glycol polishing discharge stream 46. The mixed liquid and gas may be lifted at a sufficient velocity to minimize breakout of vapor from liquid. At a higher elevation, the mixed fluid (stripping gas and lean glycol) enters a separator in which the vapor and liquid substantially separate. The higher elevation is an elevation sufficient to allow the lifted liquid to flow through lean glycol discharge stream 44, lean/rich heat exchanger 80, line filter 86, cooled lean glycol stream 84 surge tank 88 to the suction of circulating pump 89. In certain embodiments, about one equilibrium stage of contact may occur in liquid lifting vessel 100.

As shown in FIG. 2, liquid lifting vessel 100 includes gas/glycol mixing pot 130, glycol outlet downcomer 200, and gas/glycol separator 170. Each of gas/glycol mixing pot 130, glycol outlet downcomer 200, and gas/glycol separator 170 may be a pressure vessel or a section of piping. Gas/glycol outlet downcomer 200 and gas/glycol separator 170 may be fluidly connected such that liquid and vapor may readily move between glycol outlet downcomer 200 and gas/glycol separator 170. Gas/glycol mixing pot 130, glycol outlet downcomer 200, and gas/glycol separator 170 may be connected by flanges, as shown in FIG. 2, or formed integrally. In an example, gas/glycol mixing pot 130 and gas/glycol separator 170 may be of greater diameter than glycol outlet downcomer 200.

Liquid lifting vessel 100 may further include glycol weir 140 positioned within gas/glycol mixing pot 130. The volume of liquid held by glycol weir 140 and shell of gas/glycol mixing pot 130 may be equal to or greater than the volume of the vertical section of glycol feed downcomer 110. Such a volume of liquid, in conjunction with check valve 245, may assist in maintaining a liquid seal and so restrict vapor backflow through downcomer 110. Gas/glycol mixing pot 130 includes gas inlet 150 and glycol inlet 120. Gas inlet 150 may be positioned in the upper portion of gas/glycol mixing pot 130. In one embodiment, gas inlet 150 is positioned above the level of glycol 300 held by glycol weir 140 within gas/glycol mixing pot 130 (described below). Glycol inlet 120 may be positioned in the lower portion of gas/glycol mixing pot 130. In one embodiment, glycol inlet 120 is positioned below the level of the glycol 300 held by glycol weir 140 within gas/glycol mixing pot 130. Drain valves 240 and 250 may be positioned at the bottom of gas/glycol mixing pot 130.

Glycol outlet downcomer 200 includes gas/glycol riser 160 positioned annularly within inner wall 205 of glycol outlet downcomer 200. Gas/glycol mixing pot 130 may be fluidly connected to gas/glycol separator 170 by gas/glycol riser 160 but Gas/glycol mixing pot 130 may be otherwise sealed from glycol outlet downcomer 200 and gas/glycol separator 170. Glycol outlet downcomer 200 further includes glycol outlet 210, positioned in the bottom portion of glycol outlet downcomer 200. Gas/glycol riser 160 extends through separator glycol outlet 190 and into gas/glycol separator 170 and gas/glycol mixing pot 130. To retard entrained glycol droplets from exiting gas/glycol separator 170, gas/glycol separator 170 may include splash plate 180 and mist pad 184. In certain embodiments, mist pad 184 may be a mesh screen. In certain other embodiments, mist pad 184 may be omitted. Gas outlet 220 is positioned at or near the top of gas/glycol separator 170.

As further shown in FIG. 2, liquid lifting vessel 100 is connected to polishing stahl column section 40 by glycol feed downcomer 110, which exits the bottom of polishing stahl column section 40 and is connected to glycol inlet 120. In certain embodiments, check valve 245 is positioned in glycol feed downcomer 110 to prevent or retard liquid from gas/glycol mixing pot 130 from back flowing into polishing stahl column section 40. Liquid lifting vessel 100 is further connected to polishing stahl column section 40 by gas outlet pipe 230, which is connected to gas outlet 220.

The liquid glycol flows out through the bottom of gas/glycol separator 170 and through glycol outlet downcomer 200. The glycol then reaches outlet liquid level 320. The space above outlet liquid level 320 is vapor with liquid descending through the vapor. The space below outlet liquid level 320 is liquid. The liquid builds pressure as it descends and exits liquid lifting vessel 100 as lean glycol discharge stream 44 through glycol outlet 210. The glycol flows to lean/rich heat exchanger 80.

Outlet liquid level 320 may self-adjust as needed to supply the pressure to downstream equipment. Outlet liquid level 320 may be at a lower elevation than the elevation of glycol outlet 210. Further, glycol weir liquid level 310 creates a seal to restrict stripping gas from back flowing up glycol feed downcomer 110. The downcomer liquid level self-adjusts to supply the pressure energy to flow the glycol over glycol weir 140 within gas/glycol mixing pot 130. In certain embodiments, no instrumentation or controls are used in liquid lifting vessel 100.

Figure 3:
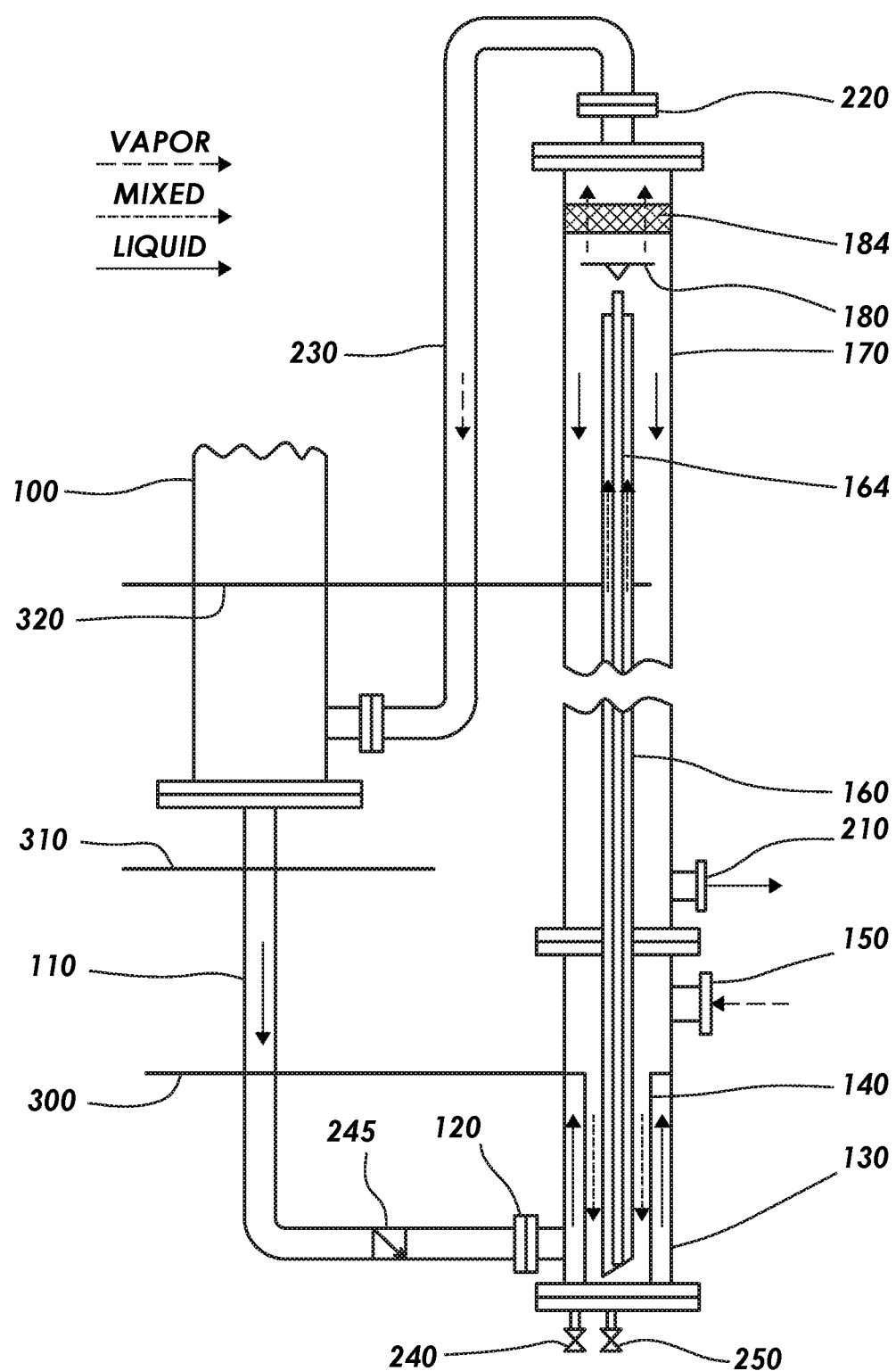
FIG. 3 depicts a liquid lifting vessel consistent with at least one embodiment of the present disclosure.

In another embodiment, as shown in FIG. 3, glycol outlet downcomer 200 is omitted and gas/glycol separator 170 is positioned on top of gas/glycol mixing pot 130. Gas/glycol riser 160 may include velocity control rod 164 disposed annularly within. Velocity control rod 164 may operate by occupying a portion of the cross-sectional area that mixed fluid may flow through of gas/glycol riser 160 and may be at approximately the same length as gas/glycol riser 160. Installing velocity control rod 164 may increase the velocity of mixed fluid within gas/glycol riser 160. Velocity control rod 164 may be replaced with a different diameter rod to optimize the velocity within gas/glycol riser 160. Velocity control rod 164 may include a plurality of diameters and may include a plurality of tapers.

During operation of liquid lifting vessel 100, the stripping gas may provide pneumatic energy. In certain embodiments, the stripping gas is preheated within either reboiler 58 or reheater 66 and stripping gas stream 92 enters gas/glycol mixing pot 130 through gas inlet 150.

Glycol exits through lean glycol polishing discharge stream 46 from the bottom portion of polishing stahl column section 40 and flows through glycol feed downcomer 110 through glycol inlet 120. Within gas/glycol mixing pot 130, the glycol falls over glycol weir 140 towards the bottom of gas/glycol mixing pot 130.

The glycol and stripping gas mix near the bottom of gas/glycol mixing pot 130. The mixed vapor/liquid density is less than the liquid glycol density and the mixed fluid is gas lifted through gas/glycol riser 160 into gas/glycol separator 170, which acts as a diffuser. The velocity in gas/glycol riser 160 may be greater than about 15 feet per second but may be less than flows that would create high friction pressure drop.

The vapor and liquid exit the top of the gas/glycol riser 160 and separate within the gas/glycol separator 170 with the vapor flowing through mist pad 184 and exiting through top of the gas/glycol separator 170 through gas outlet 220. The stripping gas then flows through gas outlet pipe 230 as stripping gas stream 94 and into the bottom portion of polishing stahl column section 40.

Liquid lifting vessel 100 may be used in any glycol dehydration unit that utilizes stripping gas, including, but not limited to, pipeline dehydration applications.

Figure 6:
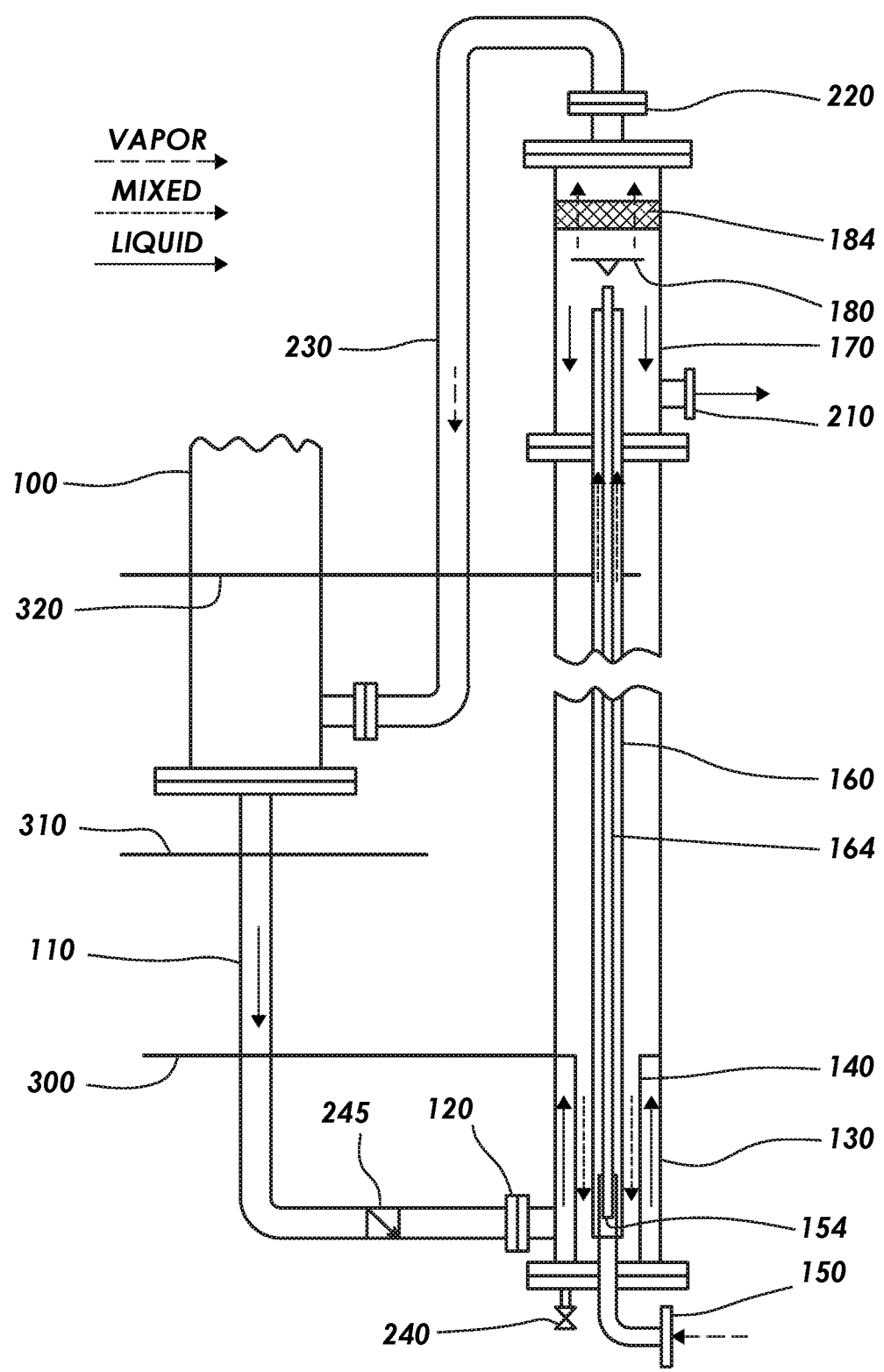
FIG. 6 depicts a liquid lifting vessel consistent with at least one embodiment of the present disclosure.

In another embodiment, as shown in FIG. 6, educator 154 is positioned within gas glycol mixing pot 130. Gas inlet 150 may be positioned as a bottom inlet with a feed to gas/glycol mixing pot 130 and flows into educator 154.

Figure 4:
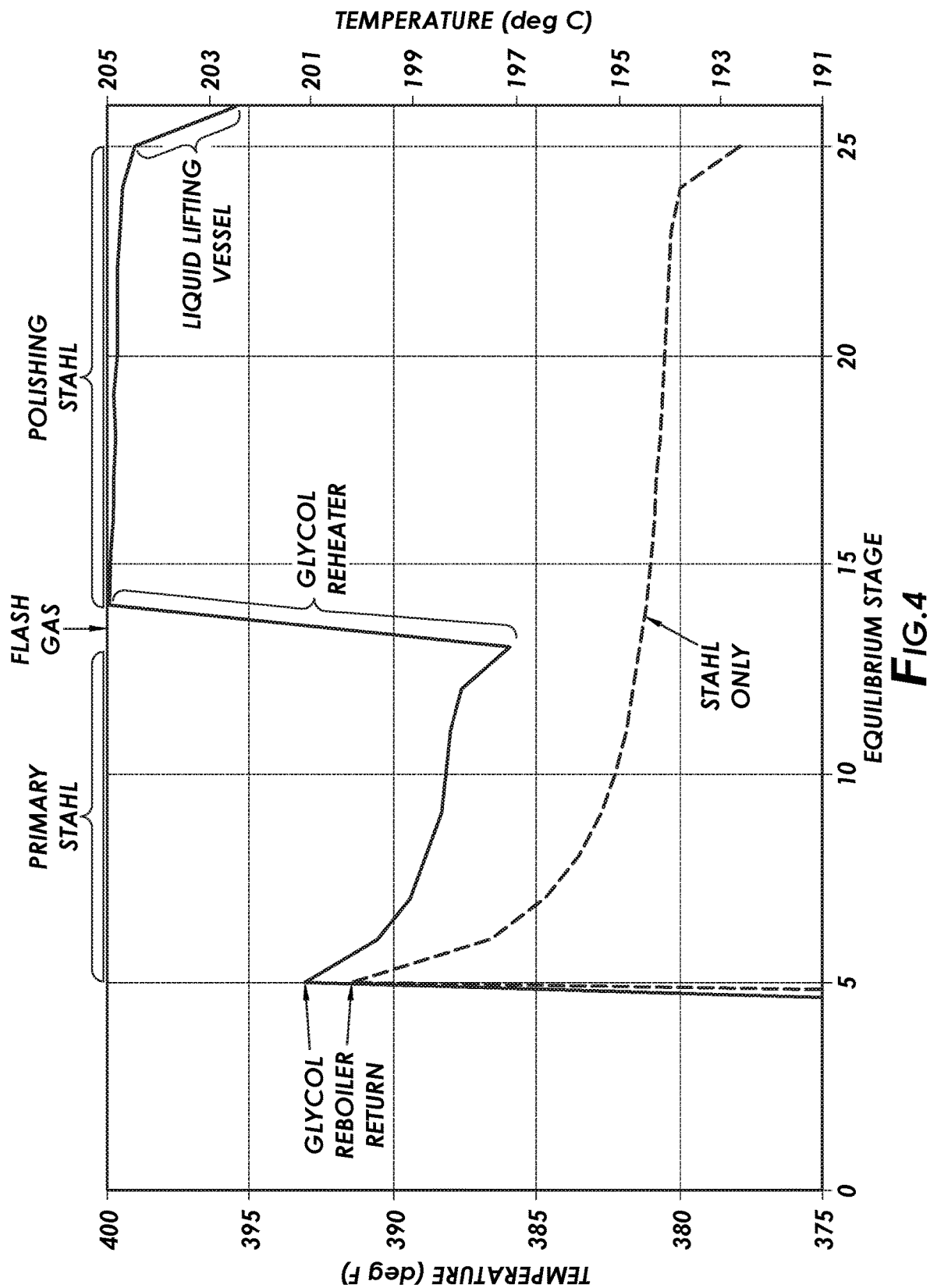
FIG. 4 is a graph of temperature versus equilibrium stages consistent with operation of a wet gas drying system in some embodiments of the present disclosure.

Although liquid lifting vessel 100 is shown in FIGS. 2, 3, and 4 as connected to polishing stahl column section 40, liquid lifting vessels 100 may be connected to the exit streams of any of still section 50, primary stahl column 60, and polishing stahl column 40.

In other embodiments, wherein still section 50, primary stahl column section 60, and polishing stahl column section 40 are separate columns, liquid lifting vessel 100 may be utilized to lift glycol from still section 50 to primary stahl section 60, and another liquid lifting vessel 100 may be utilized to lift glycol from primary stahl column section 60 to polishing stahl column section 40. Separate stripping gas streams would be required to operate these additional liquid lifting vessels 100.

As shown in FIG. 4, the temperature within primary stahl column section 60 is not constant. Rather, the temperature of primary stahl column section 60 drops as the water is stripped from the glycol that descends through primary stahl column section 60. Therefore, the temperature of the bottom of primary stahl column section 60 is at a lower temperature than the top of primary stahl column section 60. This effect may occur regardless of whether reheater 66 is present. Without being bound by theory, this temperature reduction is principally a result of the latent heat of vaporization of water into the stripping gas. Reheating the glycol within still/stahl column 30 will reduce the temperature reduction.

FIG. 4 shows two temperature profiles as compared to equilibrium stages of a stahl column, the first depicting a stahl column without a glycol reheater, flash gas as supplemental stripping gas, or a liquid lifting vessel ("stahl only profile"). The second temperature profile includes still/stahl column 30 having reheater 66, flash gas as supplemental stripping gas, and liquid lifting vessel 100 ("still/stahl column profile").

The stahl only temperature profile shows a regular decline in temperature as the glycol descends through the stahl column. At the last stage, the temperature decline is larger than previous stages. Without being bound by theory, the temperature decline is due to the stripping gas saturating with glycol as it enters the stahl column. Even though the stripping gas has been preheated to 400° F. (204° C.) saturating the stripping gas with glycol causes this larger temperature decline. Most of the stahl column is minimally affected by this saturation stage. In shorter stahl columns, this effect is more pronounced.

In the still/stahl column profile, reheater 66 has a pronounced impact on the still/stahl column profile. Glycol in polishing stahl column section 40 below reheater 66 may operate very close to reheater 66 temperature of 400° F. (204° C.). In certain embodiments, reheater 66 and reboiler 58 operate at the same temperature. Liquid lifting vessel 100 may be external to still/stahl column 30 but may act as an extra stage of contact due to intimately mixing vapor and liquid within gas/glycol riser 160. As shown in FIG. 4, the injected flash gas causes a small reduction of the temperature at stage 14 where the flash gas is injected. While shown as injected at equilibrium stage 14, this is non-limiting. This flash gas is unheated, so it may be desirable in some embodiments to increase the sensible temperature as well as saturate the stripping gas with glycol.

The temperature of the glycol entering the column at equilibrium stage 5 is higher for the still/stahl column than for stahl only. This difference may result from having less water to reboil for the still/stahl column. The glycol stream loses less temperature as it flows to the column. The glycol temperature exiting lean/rich heat exchanger 80, as shown in a non-limiting manner in FIG. 4 increases from 305° F. (152° C.) for the stahl only case to 356° F. (180° C.) for the still/stahl column.

Figure 5:
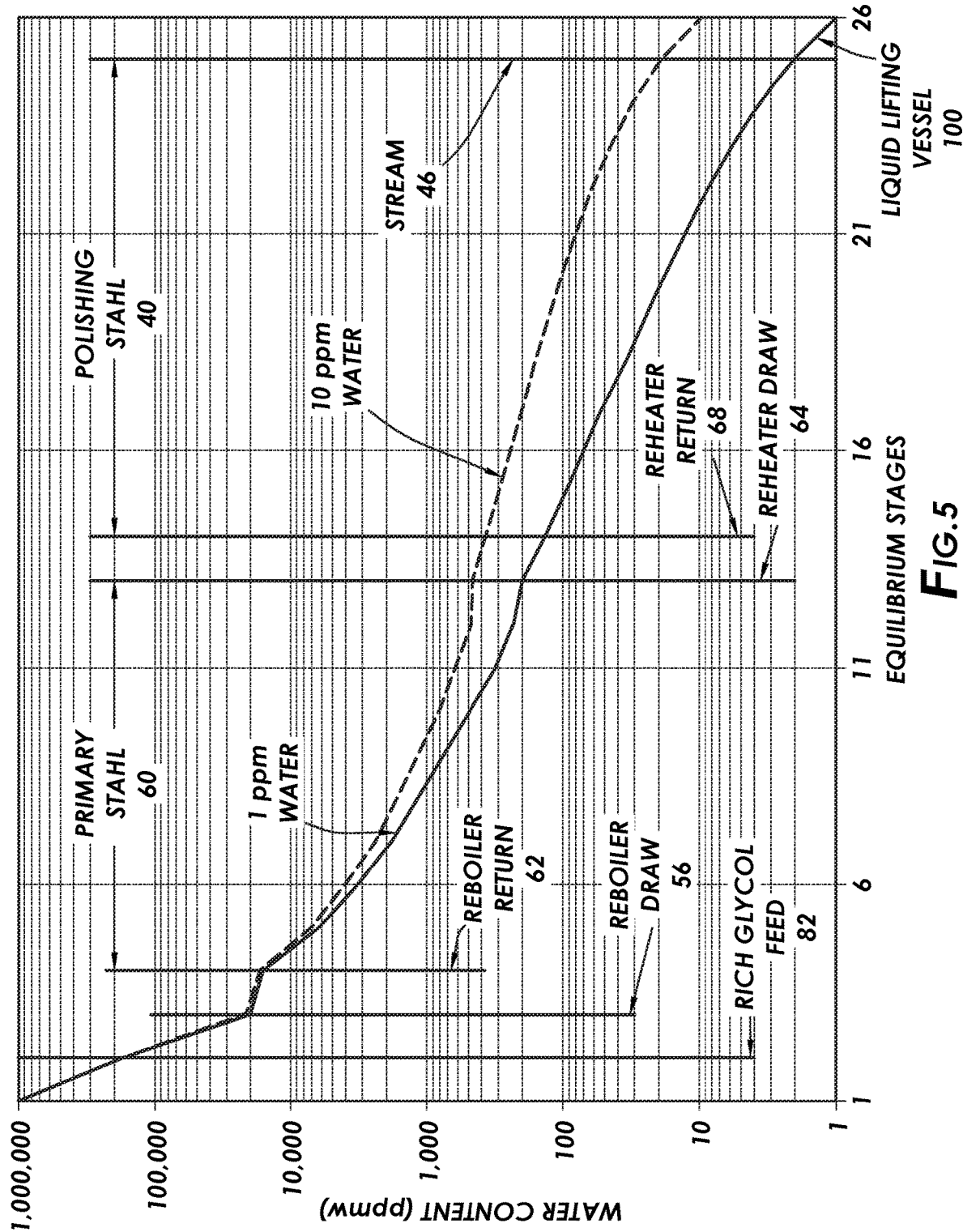
FIG. 5 is a graph of the variation of water concentration along the length of a still/stahl column consistent with at least one embodiment of the present disclosure.

FIG. 5 is a graph of the variation of water concentration along the length of a still/stahl column consistent with at least one embodiment of the present disclosure. FIG. 5 shows the range of water concentrations for rich glycol as water is removed from it.

Two different operating conditions are shown. The first operating condition is for a 10 ppmw water specification and the second is for a 1 ppmw water specification. Both operating conditions should be sufficient to dehydrate wet gas to meet a dehydration specification suitable for cryogenic applications. A difference between these two operating conditions is the amount of stripping gas required. Adding 17% more stripping gas reduces the water content of the lean glycol by a factor of ten; 10 ppmw drops to 1 ppmw water.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A process comprising:
supplying a still/stahl column, the still/stahl column comprising;
a still section;
a primary stahl section, the primary stahl section positioned beneath the still section; and
a polishing stahl section, the polishing stahl section positioned beneath the primary stahl section;
feeding a water rich glycol still feed stream to the still section, the water rich glycol feed stream having water rich glycol;
feeding a stripping gas feed stream to the polishing stahl section, the stripping gas feed stream having stripping gas;
withdrawing a reboiler draw stream from the still section;
heating the reboiler draw stream in a reboiler to form a reboiler inlet stream;
injecting the reboiler inlet stream into the primary stahl section;
withdrawing reheater stream from a bottom of the primary stahl section;
heating the reheater stream in reheater to form a reheater inlet stream;
injecting the reheater inlet stream into the polishing stahl section;
stripping water from the water rich glycol with the stripping gas;
withdrawing a still stripping gas stream from a top portion of the still section; and
withdrawing a lean glycol polishing discharge stream from a bottom portion of the polishing stahl section.

2. The process of claim 1 further comprising:
feeding a flash gas stream to the primary stahl section.

3. The process of claim 1 further comprising injecting a condensing water stream into the top of the still section.

* * * * *